United States Patent
Stanjek et al.

(10) Patent No.: US 8,907,027 B2
(45) Date of Patent: Dec. 9, 2014

(54) CROSS-LINKABLE MATERIALS BASED ON ORGANYL OXYSILANE-TERMINATED POLYMERS

(75) Inventors: Volker Stanjek, Ampfing (DE); Bernd-Josef Bachmeier, Haiming (DE); Lars Zander, Neuoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/233,072

(22) PCT Filed: Jul. 30, 2012

(86) PCT No.: PCT/EP2012/064889
§ 371 (c)(1),
(2), (4) Date: Jan. 15, 2014

(87) PCT Pub. No.: WO2013/026654
PCT Pub. Date: Feb. 28, 2013

(65) Prior Publication Data
US 2014/0155545 A1 Jun. 5, 2014

(30) Foreign Application Priority Data
Aug. 19, 2011 (DE) .......................... 10 2011 081 264

(51) Int. Cl.
| | |
|---|---|
| C08G 77/18 | (2006.01) |
| C09D 183/06 | (2006.01) |
| C08L 89/04 | (2006.01) |
| C09J 175/08 | (2006.01) |
| C08L 83/06 | (2006.01) |
| C09J 183/04 | (2006.01) |
| C09J 183/06 | (2006.01) |
| C09D 183/04 | (2006.01) |
| C08G 18/48 | (2006.01) |

(52) U.S. Cl.
CPC ............ *C09J 175/08* (2013.01); *C09D 183/06* (2013.01); *C08L 89/04* (2013.01); *C08L 83/06* (2013.01); *C09J 183/04* (2013.01); *C09J 183/06* (2013.01); *C09D 183/04* (2013.01); *C08G 18/4825* (2013.01)
USPC ......................................... 525/474; 525/453

(58) Field of Classification Search
USPC .................................................. 525/474, 453
See application file for complete search history.

(56) References Cited

U.S. PATENT DOCUMENTS

| | | | |
|---|---|---|---|
| 7,319,128 | B2 | 1/2008 | Ziche et al. |
| 8,101,704 | B2 | 1/2012 | Baumann et al. |
| 8,513,352 | B2 | 8/2013 | Kohl et al. |
| 2002/0115811 | A1* | 8/2002 | Huang et al. .................... 528/24 |
| 2010/0154991 | A1 | 6/2010 | Cagan et al. |
| 2011/0130512 | A1 | 6/2011 | Ludewig et al. |
| 2012/0165493 | A1 | 6/2012 | Stanjek et al. |
| 2013/0029037 | A1 | 1/2013 | Stanjek et al. |

FOREIGN PATENT DOCUMENTS

| | | |
|---|---|---|
| DE | 102010001588 A1 | 8/2011 |
| EP | 1535940 B1 | 6/2007 |
| EP | 1896523 B1 | 10/2010 |
| WO | 9634028 | 10/1996 |
| WO | 2011026658 A1 | 3/2011 |
| WO | 2011131506 A1 | 10/2011 |

* cited by examiner

*Primary Examiner* — Kuo-Liang Peng
(74) *Attorney, Agent, or Firm* — Brooks Kushman P.C.

(57) ABSTRACT

Moisture curable adhesives of high tensile shear strength contain an alkoxysilyl-terminated polymer and an alkoxy-functional silicone resin.

11 Claims, No Drawings

CROSS-LINKABLE MATERIALS BASED ON ORGANYL OXYSILANE-TERMINATED POLYMERS

CROSS-REFERENCE TO RELATED APPLICATIONS

This application is the U.S. National Phase of PCT Appln. No. PCT/EP2012/064889 filed Jul. 30, 2012, which claims priority to German Application No. 10 2011 081 264.4, filed Aug. 19, 2011, the disclosure of which is incorporated in its entirety by reference herein.

BACKGROUND OF THE INVENTION

1. Field of the Invention

The invention relates to crosslinkable compositions of silane-crosslinkable prepolymers, methods for producing them, and their use as adhesives and sealants, more particularly as adhesives with high tensile shear strength for bonding applications including wood bonding.

2. Description of the Related Art

Among the systems known for implementing bonds to wood are wood glues, formulated typically on the basis of polyvinyl acetate dispersions. While these glues do exhibit effective adhesion to wood, their setting rate, i.e., the time which elapses until a load-bearing bond has formed, is nevertheless very long, meaning that long-lasting mechanical fixing of the workpieces to be bonded is generally unavoidable. Furthermore, the use of this type of adhesive presents problems if the bond is exposed to moisture, since the wood glues typically have a limited resistance toward water. In the case of wooden constructions which receive high loads, where requirements in relation to the mechanical strength of the components are exacting and where the bond strength is still to be high enough even after many years under effects of weathering, wood glues of this kind are usually not suitable.

Here, typically, isocyanate-crosslinking PU adhesives are employed. These adhesives usually comprise aromatic polyisocyanates. Systems of this kind cure by reaction of the isocyanate groups with (atmospheric) moisture. Since PU adhesives cure via a chemical crosslinking reaction and are also able to attach chemically to a wood substrate, they exhibit significantly better mechanical properties and are also substantially more resistant toward external (weathering) effects such as moisture or direct water contact.

The general performance of adhesives is ascertained by their compliance with standards, such as, for example, DIN EN 204, durability class D1-D4. These standards can generally be met by isocyanate-crosslinking adhesives.

Nevertheless, even some isocyanate-crosslinking adhesives possess massive disadvantages inherent in the system. For example, one-component PU adhesive systems generally possess no more than moderate cure rates. It is true that the isocyanate crosslinking can in principle be accelerated sharply by catalysis. However, since such catalysis in principle also catalyzes unwanted side reactions of the isocyanate groups (e.g., formation of allophanates, uretdiones, isocyanurates, etc.), the systems in question then no longer have sufficient shelf life.

Another disadvantage of the isocyanate-crosslinking adhesives is the health-related classification, which ranges from sensitizing to toxic. A critical factor here is the amount of monomeric isocyanates which remain, and which are removable only with difficulty. This presents problems for the end user, i.e., the craftworker or do-it-yourself user, who comes into contact not only with the fully cured and hence isocyanate-free and entirely unobjectionable product, but also with the isocyanate-containing adhesive, or monomeric isocyanates. For the unpracticed home improver there is a particular risk here that the products may not be used expertly and/or properly. Additional hazards arise here from incorrect storage as well, such as storage within the reach of children, for example. With the professional craftworker, on the other hand, proper use and storage can be assumed. Here, however, the problem exists that the professional user is required very regularly indeed—possibly even a number of times a day—to work with the isocyanate-containing material, something which is potentially critical in view in particular of the aforementioned sensitizing and also possibly carcinogenic effects of isocyanates.

Somewhat more favorable in this respect are isocyanate-crosslinking adhesives which contain only very low levels of volatile isocyanates and are therefore at least free from labeling requirements. These adhesives, however, are mostly based on aliphatic isocyanates, which in turn are less reactive. For applications where rapid setting of the adhesive is a factor, therefore, these adhesives are even more unfavorable than conventional PU adhesives.

An alternative curing technology which is finding application increasingly in the adhesives sector is that of silane crosslinking, where alkoxysilane-functional prepolymers, on contact with atmospheric moisture, initially undergo hydrolysis and then cure through a condensation reaction. The corresponding silane-functional—usually silane-terminated—prepolymers are entirely unobjectionable from a toxicological standpoint.

Polymer systems which possess reactive alkoxysilyl groups have been known for a long time. On contact with water or atmospheric moisture, these alkoxysilane-terminated polymers are capable even at room temperature of undergoing condensation with one another, with elimination of the alkoxy groups. Thus adhesives based on alkoxysilane-crosslinking polymers, in the fully cured state, exhibit not only good properties of adhesion to a number of substrates, but also very good mechanical properties, since they may possess not only tensile strength but also high elasticity.

Preference here is given in numerous applications to one-component systems (1K systems), which cure on contact with atmospheric moisture. The critical advantages of one-component systems include in particular their very great ease of application, since in this case there is no need for the user to mix a variety of adhesive components. In addition to the time/work saving and the reliable avoidance of possible metering errors, there is also no need with one-component systems to process the adhesive/sealant within a usually decidedly narrow time window, as is the case with multicomponent systems after mixing of the two components has taken place.

A disadvantage of these systems in line with the prior art is, in particular, the low reactivity of the corresponding MS polymers or SPUR polymers with respect to moisture, necessitating an aggressive catalysis. The mixtures in question therefore typically include considerable amounts of toxicologically objectionable tin catalysts.

An advantage here is the use of what is called α-silane-terminated prepolymers, which possess reactive alkoxysilyl groups joined via a methylene spacer to an adjacent urethane unit. This class of compound is highly reactive and requires neither tin catalysts nor strong acids or bases in order to achieve high cure rates on air contact. Commercially available α-silane-terminated prepolymers are GENIOSIL® STP-E10 or -E30 from Wacker-Chemie AG.

However, a disadvantage of the usual common silane-crosslinking systems is a relatively low tensile shear strength. Typical applications for this new type of adhesive are confined, consequently, in general to areas in which the requirement is for elastic adhesives more than for adhesives of high tensile strength.

In the case of which meet the European DIN EN 204 standard, durability class D4, silane-crosslinking adhesives are likewise achievable in principle—for example, with silane-terminated polyurethanes, of the kind described in WO 2011/026658. The high tensile shear strength here is achieved through the use of prepolymers which on the one hand have a very high density of urea units and/or urethane units that are capable of hydrogen bonding, and on the other hand are relatively short-chain and thus have a correspondingly high number of crosslinkable silane groups. Systems of this kind, however, inevitably possess two inherent disadvantages. First, the preparation of polymers with a high concentration of silane-crosslinking groups necessitates correspondingly large quantities of silane. These silanes, however, generally constitute the most cost-intensive prepolymer constituents, raising the raw materials costs for these products accordingly. Secondly, the high concentration of urethane groups and/or urea groups, which is likewise necessary for achieving high tensile shear strengths, leads to very high prepolymer viscosities. Corresponding problems affect both the compounding of these prepolymers to form fully formulated adhesives, and the application of these end products, which are usually likewise of comparatively high viscosity.

SUMMARY OF THE INVENTION

The invention provides crosslinkable composition comprising
(A) 100 parts by weight of compounds (A) of the formula

$$Y\text{—}[(CR^1_2)_b\text{—}SiR_a(OR^2)_{3-a}]_x \quad (I),$$

where
Y is an x-valent polymer radical bonded via nitrogen, oxygen, sulfur, or carbon,
R may be identical or different and is a monovalent, optionally substituted, SiC-bonded hydrocarbon radical,
$R^1$ may be identical or different and is hydrogen atom or a monovalent, optionally substituted hydrocarbon radical, which may be attached to the carbon atom by a nitrogen, phosphorus, oxygen, sulfur or carbonyl group,
$R^2$ may be identical or different and is hydrogen atom or a monovalent, optionally substituted hydrocarbon radical,
X is an integer from 1 to 10, preferably 1, 2, or 3, more preferably 1 or 2,
a may be identical or different and is 0, 1, or 2, preferably 0 or 1, and
b may be identical or different and is an integer from 1 to 10, preferably 1, 3, or 4, more preferably 1 or 3, more particularly 1, and
(B) more than 50 parts by weight of silicone resins comprising units of the formula

$$R^3_c(R^4O)_dR^5_eSiO_{(4-c-d-e)/2} \quad (II),$$

where
$R^3$ may be identical or different and is hydrogen, a monovalent, SiC-bonded, optionally substituted aliphatic hydrocarbon radical, or a divalent, optionally substituted, aliphatic hydrocarbon radical which bridges two units of the formula (II),
$R^4$ may be identical or different and is hydrogen or a monovalent, optionally substituted hydrocarbon radical,
$R^5$ may be identical or different and is a monovalent, SiC-bonded, optionally substituted aromatic hydrocarbon radical,
c is 0, 1, 2, or 3,
d is 0, 1, 2, or 3, preferably 0, 1, or 2, more preferably 0 or 1, and
e is 0, 1, or 2, preferably 0 or 1,
with the proviso that the sum of c+d+e is less than or equal to 3 and in at least 40% of the units of the formula (II) the sum c+e is 0 or 1.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals, such as the cyclopentyl, cyclohexyl, cycloheptyl and methylcyclohexyl radicals; alkenyl radicals such as the vinyl, 1-propenyl, and the 2-propenyl radical; aryl radicals such as the phenyl, naphthyl, anthryl, and phenanthryl radicals; alkaryl radicals such as o-, m-, p-tolyl radicals, xylyl radicals and ethylphenyl radicals; and aralkyl radicals, such as the benzyl radical, and the α- and β-phenylethyl radicals.

Examples of substituted radicals R are haloalkyl radicals, such as the 3,3,3-trifluoro-n-propyl radical, the 2,2,2,2',2',2'-hexafluoroisopropyl radical, and the heptafluoroisopropyl radical, and haloaryl radicals such as the o-, m-, and p-chlorophenyl radicals.

Radical R preferably comprises monovalent hydrocarbon radicals which are optionally substituted by halogen atoms and which have 1 to 6 carbon atoms, more preferably alkyl radicals having 1 or 2 carbon atoms, more particularly the methyl radical.

Examples of radicals $R^1$ are hydrogen, the radicals specified for R, and also optionally substituted hydrocarbon radicals bonded to the carbon atom via nitrogen, phosphorus, oxygen, sulfur, carbon, or carbonyl groups.

Preferably $R^1$ is hydrogen or hydrocarbon radicals having 1 to 20 carbon atoms, more particularly hydrogen.

Examples of radical $R^2$ are hydrogen or the examples specified for radical R.

Radical $R^2$ is preferably hydrogen or alkyl radicals which are optionally substituted by halogen atoms and which have 1 to 10 carbon atoms, more preferably alkyl radicals having 1 to 4 carbon atoms, and most preferably methyl and ethyl radical.

Polymers on which the polymer radical Y is based are to be understood for the purposes of the present invention to be all polymers in which at least 50%, preferably at least 70%, more preferably at least 90% of all the bonds in the main chain are carbon-carbon, carbon-nitrogen, or carbon-oxygen bonds.

Polymer radical Y preferably comprises organic polymer radicals which as polymer chains, comprise polyoxyalkylenes such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as polyisobutylene, polyethylene, or polypropylene, and copolymers of polyisobutylenes with isoprene; polyisoprenes; polyurethanes; polyesters, polyamides; polyacrylates; polymethacrylates; and polycarbonates, and which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR'— to the group or groups —[(CR$^1_2$)$_b$—SiR$_a$(OR$^2$)$_{3-a}$], where R' may be identical or different and has a definition given for R, or is a group —CH(COOR")—CH$_2$—COOR", in which R" may be identical or different and has a definition specified for R.

Examples of radicals R' are cyclohexyl, cyclopentyl, n-propyl and isopropyl, n-butyl, isobutyl, and tert-butyl, the various stereoisomers of the pentyl radical, hexyl radical, or heptyl radical, and also the phenyl radical.

Radical R' is preferably a group —CH(COOR")—CH$_2$—COOR" or an optionally substituted hydrocarbon radical having 1 to 20 carbon atoms, more preferably a linear, branched or cycloalkyl group having 1 to 20 carbon atoms, or an aryl group which has 6 to 20 carbon atoms and is optionally substituted by halogen atoms.

The radicals R" are preferably alkyl groups having 1 to 10 carbon atoms, more preferably methyl, ethyl, or propyl radicals.

More preferably radical Y in formula (I) comprises polyurethane radicals and polyoxyalkylene radicals, more particularly polyoxypropylene-containing polyurethane radicals or polyoxypropylene radicals.

The component (A) here may have the groups —[(CR$^1_2$)$_b$—SiR$_a$(OR$^2$)$_{3-a}$], attached in the manner described, at any desired locations within the polymer, such as, for instance, within the chain and/or terminally, preferably within the chain and terminally, more preferably terminally.

The end groups of the compounds (A) used in accordance with the invention are preferably groups of the general formulae

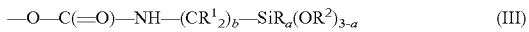     (III)

and

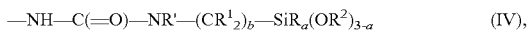     (IV), where the radicals and indices have one of the definitions specified above for them.

In one particularly preferred embodiment of the invention, component (A) comprises silane-terminated polyethers and silane-terminated polyurethanes, more particularly silane-terminated polypropylene glycols and silane-terminated polyurethanes, in each case with dimethoxymethylsilyl, trimethoxysilyl, diethoxymethyl-silyl, or triethoxysilyl end groups that are attached via —O—C(=O)—NH—(CR$^1_2$)$_b$ groups or —NH—C(=O)—NR'—(CR$^1_2$)$_b$ groups, where R', R$^1$ and b have one of the definitions specified above.

The average molecular weights M$_n$ of the compounds (A) is preferably at least 400 g/mol, more preferably at least 600 g/mol, more particularly at least 800 g/mol, and preferably not more than 30,000 g/mol, more preferably not more than 19,000 g/mol, and most preferably not more than 13,000 g/mol.

The viscosity of the compounds (A) is preferably at least 0.2 Pas, more preferably at least 1 Pas, more preferably at least 5 Pas, and preferably not more than 1000 Pas, more preferably not more than 700 Pas, in each case measured at 20° C.

The compounds (A) used in accordance with the invention are commercial products or can be prepared by methods that are commonplace within chemistry.

The polymers (A) may be prepared by various known processes such as addition reactions, for example the hydrosilylation, Michael addition, Diels-Alder addition, or reactions between isocyanate-functional compounds with compounds containing isocyanate-reactive groups.

In the case of a first, particularly preferred embodiment of the invention, component (A) comprises, as polymer radicals Y, linear or branched polyoxyalkylene radicals, more preferably polyoxypropylene radicals, whose chain ends are bonded preferably via —O—C(=O)—NH— to the group or groups —[(CR$^1_2$)$_b$—SiR$_a$(OR$^2$)$_{3-a}$], the radicals and indices having one of the definitions stated above. Here, preferably at least 85%, more preferably at least 90%, more particularly at least 95%, of all the chain ends are bonded via —O—C(=O)—NH— to the group —[(CR$^1_2$)$_b$—SiR$_a$(OR$^2$)$_{3-a}$]. The polyoxyalkylene radicals Y preferably have average molar masses M$_n$ of 4000 to 30,000 daltons, preferably of 8000 to 20,000 daltons. Suitable processes for preparing such a component (A), and also examples of component (A) itself, are also known and are described in publications including EP 1 535 940 B1 (paragraphs [0005]-[0025] and also inventive examples 1-3 and comparative example 1-4) or EP 1 896 523 B1 (paragraphs [0008]-[0047]), which are included in the disclosure content of the present specification. Corresponding silane-terminated polymers are also available commercially, under the name GENIOSIL® STP-E from Wacker Chemie, for example.

In a second, likewise particularly preferred embodiment of the invention, component (A) comprises, as polymer radical Y, linear or branched polyurethane radicals prepared starting preferably from polyether polyols and/or polyester polyols Y1 having an average molar mass of 200 to 20,000 daltons. The polyols used here are more preferably polyether polyols, more particularly polypropylene glycols, having an average molar mass of 300 to 10,000 daltons, more particularly of 400 to 5000 daltons. The polyols Y1 may be branched or unbranched. Particularly preferred are unbranched polyols or else polyols having one branching site. Mixtures of branched and unbranched polyols as well may be used.

In the preparation of component (A), the polyols Y1 are preferably reacted with at least one isocyanate-functional compound Y2. Y2 preferably comprises di- or polyisocyanates. Examples of customary diisocyanates are diisocyanatodiphenylmethane (MDI), both in the form of crude or technical MDI and in the form of pure 4,4' and/or 2,4' isomers or mixtures thereof, tolylene diisocyanate (TDI) in form of its various regioisomers, diisocyanatonaphthalene (NDI), isophorone diisocyanate (IPDI), or else of hexamethylene diisocyanate (HDI) Examples of polyisocyanates are polymeric MDI (P-MDI), triphenylmethane triisocyanate, or else trimers (biurets or isocyanurates) of the above-mentioned diisocyanates.

In terms of the ratio of the isocyanate groups to the hydroxyl groups of the polyol, these isocyanates Y2 may be used in deficit (variant 1) or in excess (variant 2). In the case of variant 1, a polyurethane polymer is obtained whose chain ends are terminated with hydroxyl groups; in the case of variant 2, a polymer is obtained whose chain ends consist of isocyanate groups.

The hydroxyl group-functional polyurethane polymer obtained in the case of variant 1 is then reacted preferably with a silane Y3 of the general formula

     (V)

where the radicals and indices have one of the definitions specified for them above. A polyurethane with chain ends of the formula (III) is obtained.

Particularly preferred, however, is variant 2. The isocyanate-functional polyurethane polymer that is obtained in this case is then preferably reacted, in a second reaction step, with an isocyanate-reactive silane Y3' of the general formula

$$Z-(CR^1{}_2)_b-SiR_a(OR^2)_{3-a} \qquad (VI)$$

where
Z is an isocyanate-reactive group and all other radicals and indices have one of the definitions specified for them above.

The isocyanate-reactive group Z is preferably a hydroxyl group or an amino group, more preferably an amino group of the formula NHR' with R' equal to one of the above-mentioned definitions. A silane-terminated polyurethane is obtained that has chain ends of the formula (IV).

Lastly, as well as the aforementioned components Y1 to Y3, it is also possible for monomeric alcohols Y4 component to be used in preparing the compound A. The alcohols Y4 may possess one or else two or more hydroxyl groups. There are preferably no restrictions with regard to the molar mass and the degree of branching of the alcohols Y4.

If alcohols Y4 are used for preparing the compounds (A), the alcohols in question are preferably of the general formula

$$R^6OH \qquad (VII),$$

where $R^6$ has one of the definitions specified for the radical R.

Radical $R^6$ is preferably a linear, or branched alkyl or alkenyl radical having at least 8 carbon atoms, particular preference being given to linear alkyl radicals having at least 8 carbon atoms, more particularly linear alkyl radicals having at least 10 carbon atoms. Preferably $R^6$ has not more than 30, more preferably not more than 20, carbon atoms.

These alcohols may likewise react with the di- or polyisocyanates Y2. This results in compounds (A) whose chain ends are not exclusively terminated with chain ends of the formula (IV) but instead also possess a certain fraction, preferably at least 2%, more preferably at least 4%, and preferably not more than 40%, more particularly not more than 20%, of chain ends of the general formula

$$-NH-C(=O)-O-R^6 \qquad (VIII)$$

in which $R^6$ has the definitions stated above.

These alcohols Y4 may have been incorporated into component (A) in a separate reaction step, for example, before or after the reaction of the polyols Y1 with the isocyanates Y2. Alternatively, however, the incorporation may also take place simultaneously with another reaction step, as for example by reacting a mixture of the polyols Y1 and the alcohols Y4 with the isocyanates Y2.

It is preferred here to use alcohols Y4, mixtures of different alcohols Y4, or else mixtures of polyols Y1 and alcohols Y4, which are liquid at room temperature and under the pressure of the surrounding atmosphere, in other words at 900 to 1100 hPa, and which, accordingly, can be metered easily into the reaction mixture.

The sequence of the synthesis steps here is in principle also interchangeable. Thus the first synthesis step may in principle also be a reaction of the isocyanate Y2 with the silane Y3', and the reaction with the polyol Y1 may not take place until the second reaction step. It is also conceivable for both reaction steps to be carried out simultaneously.

All of the reactions for preparing component (A) may be carried out both batchwise and continuously.

The preparation of the components (A) takes place optionally in the presence of a catalyst. Suitable catalysts are, for example, bismuth-containing catalysts, such as, for example, Borchi® Kat 22, Borchi® Kat VP 0243, Borchi® Kat VP 0244 from Borchers GmbH, or else those compounds which may be added as curing catalysts (E) to the crosslinkable compositions of the invention.

The components (A) are prepared preferably at temperatures of at least 0° C., more preferably at least 60° C., and preferably not more than 150° C., more particularly not more than 120° C. Preparation may be continuous or batchwise.

All of the components for preparing the compounds (A) are preferably used in a proportion according to which there is or are preferably at least 0.6, more preferably at least 0.8, and preferably not more than 1.4, more particularly not more than 1.2, isocyanate-reactive groups per isocyanate group.

The compounds (A) are preferably isocyanate-free. This freedom from isocyanate may also be achieved by using a slight excess of NCO groups relative to the NCO-reactive groups, since the excess NCO groups can also react, for example, with urethane units and/or urea units that are formed, with formation of allphanates and/or biurets, respectively.

The component (A) used in accordance with the invention may comprise only one kind of compound of the formula (I) and also mixtures of different kinds of compounds of the formula (I). In this case the component (A) may comprise exclusively compounds of the formula (I) in which more than 90%, preferably more than 95%, more preferably more than 98% of all of the silyl groups bonded to the polymer radical Y are identical. In that case, however, it is also possible to use a component (A) which comprises, at least in part, compounds of the formula (I) in which different silyl groups are bonded to a polymer radical Y. Lastly, it is also possible as component (A) to use mixtures of different compounds of the formula (I) in which a total of at least 2 different kinds of silyl groups are present, but with all silyl groups bonded to a respective polymer radical Y being identical.

If component (A) comprises different kinds of compounds of the formula (I), preferred mixtures are those which comprise not only compounds (A1) having end groups of the formula (III) or (IV) in which b is 1 and $R^1$ is H and a is 0 or 1, but also compounds (A2) having end groups of the formula (IV) or (V) in which b is 3 and $R^1$ is H and a is 0, particularly preferred mixtures being those in which the weight ratio of (A1) to (A2) is 0.1 to 10, preferably 0.2 to 5.

The compositions of the invention preferably comprise compounds (A) in concentrations of not more than 40 wt %, more preferably not more than 30 wt %, and preferably at least 10 wt %, more preferably at least 15 wt %.

Based on 100 parts by weight of component (A), the compositions of the invention preferably comprise at least 60 parts by weight, more preferably at least 80 parts by weight, more particularly at least 100 parts by weight, of component (B). Based on 100 parts by weight of component (A), the compositions of the invention preferably comprise not more than 1000 parts by weight, more preferably not more than 500 parts by weight, more particularly not more than 300 parts by weight, of component (B).

Component (B) consists preferably to an extent of at least 90 wt % of units of the formula (II). With particular preference component (B) consists exclusively of units of the formula (II).

Examples of radicals $R^3$ are the aliphatic examples specified above for R. However, radical $R^3$ may also comprise divalent aliphatic radicals which join two silyl groups of the formula (II) to one another, such as, for example, alkylene radicals having 1 to 10 carbon atoms, such as methylene, ethylene, propylene, or butylene radicals, for instance. One particularly current example of a divalent aliphatic radical is the ethylene radical.

Preferably, however, radical $R^3$ comprises monovalent, SiC-bonded aliphatic hydrocarbon atoms which are optionally substituted by halogen atoms and that have 1 to 18 carbon atoms, more preferably aliphatic hydrocarbon radicals having 1 to 6 carbon atoms, more particularly the methyl radical.

Examples of radical $R^4$ are hydrogen or the examples specified for radical R.

Radical $R^4$ comprises hydrogen or alkyl radicals that are optionally substituted by halogen atoms and that have 1 to 10 carbon atoms, more preferably alkyl radicals having 1 to 4 carbon atoms, more particularly the methyl and ethyl radicals.

Examples of radicals $R^5$ are the aromatic radicals specified above for R.

Radical $R^5$ preferably comprises SiC-bonded aromatic hydrocarbon radicals that are optionally substituted by halogen atoms and that have 1 to 18 carbon atoms, such as, for example, ethylphenyl, tolyl, xylyl, chlorophenyl, naphthyl, or styryl radicals, more preferably the phenyl radical.

Preferred for use as components (B) are silicone resins in which at least 90% of all radicals $R^3$ are methyl radicals, at least 90% of all radicals $R^4$ are methyl, ethyl, propyl, or isopropyl radicals, and at least 90% of all radicals $R^5$ are phenyl radicals.

Preference is given in accordance with the invention to using silicone resins (B) which have at least 20%, more preferably at least 40%, of units of the formula (II) in which c is 0, based in each case on the total number of units of the formula (II).

One embodiment of the invention uses silicone resins (B) which, based in each case on the total number of units of the formula (II), have at least 10%, more preferably at least 20%, and not more than 80%, more preferably not more than 60%, of units of the formula (II) in which c has the value 2.

Silicone resins (B) used with preference are those which, based in each case on the total number of units of the formula (II), have at least 80%, more preferably at least 95%, of units of the formula (II) in which d has the value 0 or 1.

Preference is given to using silicone resins (B) which, based in each case on the total number of units of the formula (II), have at least 60%, more preferably at least 70%, preferably not more than 99%, more preferably not more than 97%, of units of the formula (II) in which d has the value 0.

Employed with more preference as components (B) are silicone resins which, based in each case on the total number of units of the formula (II), have at least 1%, preferably at least 10%, more particularly at least 20% of units of the formula (II) in which e has a value other than 0. Silicone resins (B) can be used which exclusively have units of the formula (II) in which e is other than 0, but more preferably at least 10%, very preferably at least 20%, and preferably not more than 80%, more preferably not more than 60%, of the units of the formula (II) have an e of 0.

Preference is given to using silicone resins (B) which, based in each case on the total number of units of the formula (II), have at least 20%, more preferably at least 40%, of units of the formula (II) in which e has the value 1. Silicone resins (B) may be used which exclusively have units of the formula (II) in which e is 1, but more preferably at least 10%, very preferably at least 20%, and preferably not more than 80%, more preferably not more than 60%, of the units of the formula (II) have an e of 0.

Preferably used are silicone resins (B) which, based in each case on the total number of units of the formula (II), have at least 50% of units of the formula (II) in which the sum c+e is 0 or 1.

In one particularly preferably embodiment of the invention, silicone resins are used as component (B) which, based in each case on the total number of units of the formula (II), have at least 20%, more preferably at least 40%, of units of the formula (II) in which e has the value 1 and c has the value 0. In this case preferably not more than 70%, more preferably not more than 40%, of all units of the formula (II) have a d other than 0.

In another particularly preferably embodiment of the invention, silicone resins used as component (B) are resins which, based in each case on the total number of units of formula (II), have at least 20%, more preferably at least 40%, of units of the formula (II) in which e has the value 1 and c has the value 0 and which, moreover, have at least 1%, preferably at least 10%, of units of the formula (II) in which c is 1 or 2, preferably 2, and e is 0. In this case preferably not more than 70%, more preferably not more than 40%, of all units of the formula (II) have a d other than 0 and at least 1% of all units of the formula (II) have a d of 0.

Examples of the silicone resins (B) used in accordance with the invention are organopolysiloxane resins which consist substantially, preferably exclusively, of (Q) units of the formulae $SiO_{4/2}$, $Si(OR^4)O_{3/2}$, $Si(OR^4)_2O_{2/2}$ and $Si(OR^4)_3O_{1/2}$, (T) units of the formulae $PhSiO_{3/2}$, $PhSi(OR^4)O_{2/2}$ and $PhSi(OR^4)_2O_{1/2}$, (D) units of the formulae $Me_2SiO_{2/2}$ and $Me_2Si(OR^4)O_{1/2}$, and also (M) units of the formula $Me_3SiO_{1/2}$, where Me is a methyl radical, Ph is a phenyl radical, and $R^4$ is hydrogen or alkyl radicals that are optionally substituted by halogen atoms and that have 1 to 10 carbon atoms, more preferably hydrogen or alkyl radicals having 1 to 4 carbon atoms, with the resin containing preferably 0-2 mol of (Q) units, 0-2 mol of (D) units, and 0-2 mol of (M) units per mol of (T) units.

Preferred examples of the silicone resins (B) used in accordance with the invention are organopolysiloxane resins which consist substantially, preferably exclusively, of T units of the formulae $PhSiO_{3/2}$, $PhSi(OR^4)O_{2/2}$, and $PhSi(OR^4)_2O_{1/2}$ and also D units of the formulae $Me_2SiO_{2/2}$, and $Me_2Si(OR^4)O_{1/2}$, where Me is a methyl radical, Ph is a phenyl radical, and $R^4$ is hydrogen or alkyl radicals that are optionally substituted by halogen atoms and that have 1 to 10 carbon atoms, more preferably hydrogen or alkyl radicals having 1 to 4 carbon atoms, with a molar ratio of (T) to (D) units of 0.5 to 2.0.

Further preferred examples of the silicone resins (B) used in accordance with the invention are organopolysiloxane resins which consist substantially, preferably exclusively, of T units of the formulae $PhSiO_{3/2}$, $PhSi(OR^4)O_{2/2}$, and $PhSi(OR^4)_2O_{1/2}$, and also T units of the formulae $MeSiO_{3/2}$, $MeSi(OR^4)O_{2/2}$, and $MeSi(OR^4)_2O_{1/2}$, and also, optionally, D units of the formulae $Me_2SiO_{2/2}$ and $Me_2Si(OR^4)O_{1/2}$, where Me is a methyl radical, Ph is a phenyl radical, and $R^4$ is hydrogen or alkyl radicals that are optionally substituted by halogen atoms and that have 1 to 10 carbon atoms, more preferably hydrogen or alkyl radicals having 1 to 4 carbon atoms, with a molar ratio of phenylsilicone to methylsilicone units of 0.5 to 4.0. The amount of D units in these silicone resins is preferably below 10 wt %.

Additionally preferred examples of the silicone resins (B) used in accordance with the invention are organopolysiloxane resins which consist substantially, preferably exclusively, of T units of the formulae $PhSiO_{3/2}$, $PhSi(OR^4)O_{2/2}$, and $PhSi(OR^4)_2O_{1/2}$, where Ph is a phenyl radical and $R^4$ is hydrogen or alkyl radicals that are optionally substituted by halogen atoms and that have 1 to 10 carbon atoms, more preferably hydrogen or alkyl radicals having 1 to 4 carbon atoms. The amount of D units in these silicone resins is preferably below 10 wt %.

The silicone resins (B) used in accordance with the invention preferably possess an average molar mass (number average) $M_n$ of at least 400 g/mol and more preferably of at least 600 g/mol. The average molar mass $M_n$ is preferably not more than 400,000 g/mol, more preferably not more than 100,000 g/mol, more particularly not more than 50,000 g/mol.

The silicone resins (B) used in accordance with the invention may be either solid or liquid at 23° C. and 1000 hPa, with silicone resins (B) preferably being liquid. The silicone resins (B) preferably possess a viscosity of 10 to 100,000 mPas, preferably of 50 to 50,000 mPas, more particularly of 100 to 20,000 mPas. The silicone resins (B) preferably possess a polydispersity ($M_w/M_n$) of not more than 5, more preferably of not more than 3.

The silicone resins (B) may be used either in pure form or in the form of a solution in a suitable solvent.

Solvents that may be used in this case include substances such as ethers (e.g., diethyl ether, methyl tert-butyl ether, ether derivatives of glycol, THF), esters (e.g., ethyl acetate, butyl acetate, glycol esters), hydrocarbons (e.g., pentane, cyclopentane, hexane, cyclohexane, heptane, octane, or else longer-chain, branched and unbranched alkanes), ketones (e.g., acetone, methyl ethyl ketone), aromatics (e.g., toluene, xylene, ethylbenzene, chlorobenzene), or else alcohols (e.g., methanol, ethanol, glycol, propanol, isopropanol, glycerol, butanol, isobutanol, tert-butanol).

Preference, however, is given to using silicone resins (B) which are free from organic solvents.

The silicone resins (B) used in accordance with the invention are commercial products or may be prepared by methods customary within silicon chemistry.

In addition to the components (A) and (B) that are employed, the compositions of the invention may comprise all other substances which have also been used to date in crosslinkable compositions and which are different from components (A) and (B), such as, for example, organosilicon compound (C) containing basic nitrogen, fillers (D), catalyst (E), adhesion promoters (F), water scavengers (G), additives (H), and adjuvants (K).

Component (C) preferably comprises organosilicon compounds comprising units of the formula

$$D_h Si(OR^7)_g R^8_f O_{(4-f-g-h)/2} \quad (IX),$$

where

R$^7$ may be identical or different and denotes hydrogen or optionally substituted hydrocarbon radicals, D may be identical or different and denotes a monovalent, SiC-bonded radical containing basic nitrogen, R$^8$ may be identical or different and denotes a monovalent, optionally substituted, SiC-bonded organic radical free from basic nitrogen, f is 0, 1, 2, or 3, preferably 1 or 0, g is 0, 1, 2, or 3, preferably 1, 2, or 3, more preferably 2 or 3, and h is 0, 1, 2, 3, or 4, preferably 1, with the proviso that the sum of f+g+h is less than or equal to 4 and there is at least one radical D present per molecule.

In one preferred embodiment of the invention, the compositions of the invention, in addition to components (A) and (B), also comprise at least one further component (C) corresponding to the formula (IX), especially when component (A) comprises silane-terminated urethanes having end groups of the formula (IV). It was a surprise that when using components (A) and (B) which are mutually insoluble or sparingly soluble in the proportions preferred in accordance with the invention, it is possible, by adding component (C), to obtain mixtures that are largely homogeneous and preferably wholly homogeneous.

In contrast, those mixtures according to the invention that additionally comprise component (C) in the preferred quantities specified below usually, and advantageously, form a homogeneous solution.

The organosilicon compounds (C) used optionally in accordance with the invention may be not only silanes, i.e., compounds of the formula (IX) with f+g+h=4, but also siloxanes, i.e., compounds comprising units of the formula (IX) with f+g+h<3, with preference being given to silanes.

Examples of optionally substituted hydrocarbon radicals R$^7$ are the examples specified for radical R.

The radicals R$^7$ are preferably hydrogen and hydrocarbon radicals that are optionally substituted by halogen atoms and that have 1 to 18 carbon atoms; more preferably, hydrogen and hydrocarbon radicals that have 1 to 10 carbon atoms; more particularly, methyl radical and ethyl radicals.

Examples of R$^8$ are the examples specified for radical R.

Radical R$^8$ preferably comprises hydrocarbon radicals that are optionally substituted by halogen atoms and that have 1 to 18 carbon atoms, more preferably hydrocarbon radicals having 1 to 5 carbon atoms, more particularly the methyl radical.

Examples of radicals D are radicals of the formulae H$_2$N(CH$_2$)$_3$—, H$_2$N(CH$_2$)$_2$NH(CH$_2$)$_3$—, H$_2$N(CH$_2$)$_2$NH (CH$_2$)$_2$NH(CH$_2$)$_3$—, H$_3$CNH(CH$_2$)$_3$—, C$_2$H$_5$NH(CH$_2$)$_3$—, C$_3$H$_7$NH(CH$_2$)$_3$—, C$_4$H$_9$NH(CH$_2$)$_3$—, C$_5$H$_{11}$NH(CH$_2$)$_3$—, C$_6$H$_{13}$NH(CH$_2$)$_3$—, C$_7$H$_{15}$NH(CH$_2$)$_3$—, H$_2$N(CH$_2$)$_4$—, H$_2$N—CH$_2$—CH(CH3)-CH$_2$—, H$_2$N(CH$_2$)$_5$—, cyclo-C$_5$H$_9$NH(CH$_2$)$_3$—, cyclo-C$_6$H$_{11}$NH(CH$_2$)$_3$—, phenyl-NH(CH$_2$)$_3$—, (CH$_3$)$_2$N(CH$_2$)$_3$—, (C$_2$H$_5$)$_2$N(CH$_2$)$_3$—, (C$_3$H$_7$)$_2$NH(CH$_2$)$_3$—, (C$_4$H$_9$)$_2$NH(CH$_2$)$_3$—, (C$_5$H$_{11}$)$_2$NH(CH$_2$)$_3$—, (C$_6$H$_{13}$)$_2$NH(CH$_2$)$_3$—, (C$_7$H$_{15}$)$_2$NH(CH$_2$)$_3$—, H$_2$N(CH$_2$)—, H$_2$N(CH$_2$)$_2$NH(CH$_2$)—, H$_2$N(CH$_2$)$_2$NH(CH$_2$)$_2$NH(CH$_2$)—, H$_3$CNH(CH$_2$)—, C$_2$H$_5$NH(CH$_2$)—, C$_3$H$_7$NH(CH$_2$)—, C$_4$H$_9$NH(CH$_2$)—, C$_5$H$_{11}$NH(CH$_2$)—, C$_6$H$_{13}$NH(CH$_2$)—, C$_7$H$_{15}$NH(CH$_2$)—, cyclo-C$_5$H$_9$NH(CH$_2$)—, cyclo-C$_6$H$_{11}$NH(CH$_2$)—, phenyl-NH(CH$_2$)—, (CH$_3$)$_2$N(CH$_2$)—, (C$_2$H$_5$)$_2$N(CH$_2$)—, (C$_3$H$_7$)$_2$NH(CH$_2$)—, (C$_4$H$_9$)$_2$NH(CH$_2$)—, (C$_5$H$_{11}$)$_2$NH(CH$_2$)—, (C$_6$H$_{13}$)$_2$NH(CH$_2$)—, (C$_7$H$_{15}$)$_2$NH(CH$_2$)—, (CH$_3$O)$_3$Si (CH$_2$)$_3$NH(CH$_2$)$_3$—, (C$_2$H$_5$O)$_3$Si(CH$_2$)$_3$NH(CH$_2$)$_3$—, (CH$_3$O)$_2$(CH$_3$)Si(CH$_2$)$_3$NH(CH$_2$)$_3$—, and (C$_2$H$_5$O)$_2$(CH$_3$)Si(CH$_2$)$_3$NH(CH$_2$)$_3$—, and also reaction products of the abovementioned primary amino groups with compounds containing epoxide groups or double bonds that are reactive toward primary amino groups.

Radical D preferably comprises the H$_2$N(CH$_2$)$_3$—, H$_2$N(CH$_2$)$_2$NH(CH$_2$)$_3$—, and cyclo-C$_6$H$_{11}$NH(CH$_2$)$_3$— radical.

Examples of the silanes of the formula (IX) that are used optionally in accordance with the invention are H$_2$N(CH$_2$)$_3$—Si(OCH$_3$)$_3$, H$_2$N(CH$_2$)$_3$—Si(OC$_2$H$_5$)$_3$, H$_2$N(CH$_2$)$_3$—Si(OCH$_3$)$_2$CH$_3$, H$_2$N(CH$_2$)$_3$—Si(OC$_2$H$_5$)$_2$CH$_3$, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, H$_2$N(CH$_2$)$_2$NH(CH$_2$)$_3$—Si(OH)$_3$, H$_2$N(CH$_2$)$_2$NH(CH$_2$)$_3$—Si(OH)$_2$CH$_3$, H$_2$N(CH$_2$)$_2$NH(CH$_2$)$_2$NH(CH$_2$)$_3$—Si(OCH$_3$)$_3$, H$_2$N(CH$_2$)$_2$NH(CH$_2$)$_2$NH(CH$_2$)$_3$—Si(OC$_2$H$_5$)$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo—C$_6$H$_{11}$NH(CH$_2$)$_3$—Si(OC$_2$H$_5$)$_2$CH$_3$, cyclo-C$_6$H$_{11}$NH(CH$_2$)$_3$—Si(OH)$_3$, cyclo-C$_6$H$_{11}$NH(CH$_2$)$_3$—Si(OH)$_2$CH$_3$, phenyl-NH(CH$_2$)$_3$—Si(OCH$_3$)$_3$, phenyl-NH(CH$_2$)$_3$—Si(OC$_2$H$_5$)$_3$, phenyl-NH (CH$_2$)$_3$—Si(OCH$_3$)$_2$CH$_3$, phenyl-NH(CH$_2$)$_3$—Si(OC$_2$H$_5$)$_2$CH$_3$, phenyl-NH(CH$_2$)$_3$—Si(OH)$_3$, phenyl-NH(CH$_2$)$_3$—Si(OH)$_2$CH$_3$, HN((CH$_2$)$_3$—Si(OCH$_3$)$_3$)$_2$, HN((CH$_2$)$_3$—Si(OCH$_3$)$_2$CH$_3$)$_2$, HN((CH$_2$)$_3$—Si(OC$_2$H$_5$)$_3$)$_2$ HN((CH$_2$)$_3$—Si(OCH$_3$)$_2$CH$_3$)$_2$, HN((CH$_2$)$_3$—Si(OC$_2$H$_5$)$_2$CH$_3$)$_2$, cyclo-C$_6$H$_{11}$NH(CH$_2$)—Si(OCH$_3$)$_3$, cyclo-C$_6$H$_{11}$NH(CH$_2$)—Si(OC$_2$H$_5$)$_3$, cyclo-C$_6$H$_{11}$NH(CH$_2$)—Si(OCH$_3$)$_2$CH$_3$, cyclo-C$_6$H$_{11}$NH(CH$_2$)—Si(OC$_2$H$_5$)$_2$CH$_3$, cyclo-C$_6$H$_{11}$NH(CH$_2$)—Si(OH)$_3$, cyclo-C$_6$H$_{11}$NH(CH$_2$)—Si(OH)$_2$CH$_3$, phenyl-NH(CH$_2$)—Si(OCH$_3$)$_3$, phenyl-NH(CH$_2$)—Si(OC$_2$H$_5$)$_3$, phenyl-NH(CH$_2$)—Si(OCH$_3$)$_2$CH$_3$, phenyl-NH(CH$_2$)—Si(OC$_2$H$_5$)$_2$CH$_3$, phenyl-NH(CH$_2$)—Si(OH)$_3$, and phenyl-NH(CH$_2$)—Si(OH)$_2$CH$_3$, and also their partial hydrolyzates, with preference being given to H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, and cyclo-C$_6$H$_{11}$NH(CH$_2$)$_3$—Si(OCH$_3$)$_2$CH$_3$, and also, in each case, their partial hydrolyzates, and particular preference being given to H$_2$N(CH$_2$)$_2$NH(CH$_2$)$_3$—Si(OCH$_3$)$_3$, H$_2$N(CH$_2$)$_2$NH(CH$_2$)$_3$—Si(OCH$_3$)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OCH$_3$)$_2$CH$_3$, and also, in each case, their partial hydrolyzates.

In the compositions of the invention, the organosilicon compounds (C) used optionally in accordance with the invention may also take on the function of a curing catalyst or curing cocatalyst.

Furthermore, the organosilicon compounds (C) used optionally in accordance with the invention may act as adhesion promoters and/or as water scavengers.

The organosilicon compounds (C) used optionally in accordance with the invention are commercial products and/or can be prepared by methods that are commonplace within chemistry.

If the compositions of the invention do comprise component (C), the amounts in question are preferably 0.1 to 25 parts by weight, more preferably 0.5 to 10 parts by weight, in each case based on 100 parts by weight of component (A). The compositions of the invention do preferably comprise component (C).

The fillers (D) optionally employed in the compositions of the invention may be any desired fillers known to date.

Examples of fillers (D) are nonreinforcing fillers, these being fillers having a BET surface area of preferably up to 50 m$^2$/g, such as quartz, diatomerous earth, calcium silicate, zirconium silicate, talc, kaolin, zeolites, metal oxide powders, such as aluminum oxides, titanium oxides, iron oxides, or zinc oxides, and/or their mixed oxides, barium sulfate, calcium carbonate, gypsum, silicon nitride, silicon carbide, boron nitride, glass powders and polymeric powders, such as polyacrylonitrile powders; reinforcing fillers, these being fillers having a BET surface area of more than 50 m$^2$/g, such as pyrogenically prepared silica, precipitated silica, precipitated chalk, carbon black, such as furnace black and acetylene black, and mixed silicon/aluminum oxides of high BET surface area; aluminum trihydroxide, fillers in the form of hollow beads, such as ceramic microbeads, examples being those obtainable under the trade name Zeeospheres™ from 3M Deutschland GmbH of Neuss, Germany, elastic polymeric beads, of the kind, for instance, obtainable under the trade name EXPANCEL® from AKZO NOBEL, Expancel, of Sundsvall, Sweden, or glass beads; fillers in fiber form, such as asbestos and also polymeric fibers. The stated fillers may have been hydrophobized, by treatment for example with organosilanes and/or organosiloxanes or with stearic acid, or by etherification of hydroxyl groups to alkoxy groups.

The fillers (D) optionally employed are preferably calcium carbonate, talc, aluminum trihydroxide, and silica, particular preference being given to aluminum trihydroxide. Preferred calcium carbonate grades are ground or precipitated and have optionally been surface-treated with fatty acids such as stearic acid or salts thereof. The preferred silica is preferably pyrogenic (fumed) silica.

Fillers (D) optionally employed have a moisture content of preferably below 1 wt %, more preferably below 0.5 wt %.

If the compositions of the invention do comprise fillers (D), the amounts in question are preferably 10 to 1000 parts by weight, more preferably 50 to 500 parts by weight, more particularly 80 to 300 parts by weight, based in each case on 100 parts by weight of constituent (A). The compositions of the invention do preferably comprise fillers (D).

In one particular embodiment of the invention, the compositions of the invention comprise as fillers (D) a combination of a) silica, more particularly fumed silica, and
b) calcium carbonate, aluminum trihydroxide and/or talc.

If the compositions of the invention do comprise this particular combination of different fillers (D), they comprise preferably 1 to 80 parts by weight, more preferably 5 to 40 parts by weight, of silica, more particularly fumed silica, and preferably 10 to 500 parts by weight, more preferably 50 to 300 parts by weight, of calcium carbonate, aluminum trihydroxide, talc, or mixtures of these materials, based in each case on 100 parts by weight of constituent (A).

The catalysts (E) used optionally in the compositions of the invention may be any desired catalyst known to date for compositions that cure by silane condensation.

Examples of metal-containing curing catalysts (E) are organotitanium and organotin compounds, examples being titanic esters, such as tetrabutyl titanate, tetrapropyl titanate, tetraisopropyl titanate, and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (E) are basic compounds, such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis-(N,N-dimethyl-2-aminoethyl)methylamine, N,N-dimethyl-cyclohexylamine, N,N-dimethylphenylamine, and N-ethylmorpholinine.

As catalyst (E) it is likewise possible to use acidic compounds, such as phosphoric acid and its esters, toluenesulfonic acid, sulfuric acid, nitric acid, or else organic carboxylic acids, e.g., acetic acid and benzoic acid.

If the compositions of the invention do comprise catalysts (E), the amounts involved are preferably 0.01 to 20 parts by weight, more preferably 0.05 to 5 parts by weight, based in each case on 100 parts by weight of constituent (A).

In one embodiment of the invention the catalysts (E) optionally employed are metal-containing curing catalysts, preferably tin-containing catalysts. This embodiment of the invention is especially preferred when component (A) consists wholly or at least partly, in other words to an extent of at least 90 wt %, preferably at least 95 wt %, of compounds of the formula (I) in which b is other than 1.

In the compositions of the invention it is possible with preference to do without metal-containing catalysts (E), and more particularly without catalysts containing tin, when component (A) consists wholly or at least partly, in other words to an extent of at least 10 wt %, preferably at least 20 wt %, of compounds of the formula (I) in which b is 1 and R$^1$ is hydrogen. This embodiment of the invention, without metal-containing and more particularly without tin-containing catalysts, is particularly preferred.

The adhesion promoters (F) employed optionally in the compositions of the invention may be any desired adhesion promoters that have been described hitherto for systems that cure by silane condensation.

Examples of adhesion promoters (F) are epoxy silanes, such as glycidyloxypropyltrimethoxysilanes, glycidyloxypropyl-methyldimethoxysilane, glycidyloxypropyltriethoxysilane, or glycidyloxypropyl-methyldiethoxysilane, 2-(3-triethoxysilylpropyl)maleic anhydride, N-(3-trimethoxysilylpropyl)urea, N-(3-tri-ethoxysilylpropyl)urea, N-(trimethoxysilylmethyl)urea, N-(methyldimethoxysilylmethyl)urea, N-(3-triethoxysilylmethyl)urea, N-(3-methyldiethoxysilylmethyl)urea, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyl-trimethoxysilane, methacryloyloxymethyl-methyldimethoxysilane, methacryloyloxymethyl-triethoxysilane, methacryloyl-oxymethyl-methyldiethoxysilane, 3-acryloyloxypropyl-trimethoxysilane, acryloyloxymethyl-trimethoxysilane, acryloyloxymethyl-methyldimethoxysilanes, acryloyloxymethyl-triethoxysilane, and acryloyloxymethyl-methyldiethoxysilane, and also their partial condensates.

If the compositions of the invention do comprise adhesion promoters (F), the amounts involved are preferably 0.5 to 30 parts by weight, more preferably 1 to 10 parts by weight, based in each case on 100 parts by weight of crosslinkable composition.

The water scavengers (G) employed optionally in the compositions of the invention, may be any desired water scavengers described for systems that cure by silane condensation.

Examples of water scavengers (G) are silanes such as vinyltrimethoxysilane, vinyltriethoxysilane, vinyl-methyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, and/or their partial condensates, and also orthoesters, such as 1,1,1-trimethoxyethane, 1,1,1-triethoxyethane, trimethoxymethane, and triethoxymethane.

If the compositions of the invention do comprise water scavengers (G), the amounts involved are preferably 0.5 to 30 parts by weight, more preferably 1 to 10 parts by weight, based in each case on 100 parts by weight of crosslinkable composition. The compositions of the invention preferably do comprise water scavengers (G).

The additives (H) employed optionally in the compositions of the invention may be any desired additives known to date and typical for silane-crosslinking systems.

The additives (H) employed optionally in accordance with the invention are preferably antioxidants, UV stabilizers, such as HALS compounds, for example, fungicides, and pigments.

If the compositions of the invention do comprise additives (H), the amounts involved are preferably 0.01 to 30 parts by weight, more preferably 0.1 to 10 parts by weight, based in each case on 100 parts by weight of constituent (A). The compositions of the invention do preferably comprise additives (H).

The adjuvants (K) employed optionally in accordance with the invention are preferably tetraalkoxysilanes, as for example tetraethoxysilane and/or partial condensates thereof, plasticizers, including reactive plasticizers, rheological additives, flame retardants, and organic solvents.

Examples of plasticizers (K) are phthalic esters (e.g., dioctyl phthalate, diisooctyl phthalate, and diundecyl phthalate), perhydrogenated phthalic esters (e.g., 1,2-cyclohexanedicarboxylic diisononyl esters and 1,2-cyclohexanedicarboxylic dioctyl esters), adipic esters (e.g., dioctyl adipate), benzoic esters, glycol esters, esters of saturated alkanediols (e.g., 2,2,4-trimethyl-1,3-pentanediol monoisobutyrates and 2,2,4-trimethyl-1,3-pentanediol diisobutyrates), phosphoric esters, sulfonic esters, polyesters, polyethers (e.g., polyethylene glycols and polypropylene glycols with molar masses of preferably 1000 to 10,000 daltons), polystyrenes, polybutadienes, polyisobutylenes, paraffinic hydrocarbons, and branched hydrocarbons of high molecular mass, with preferably no plasticizers (K) being used.

Examples of reactive plasticizers (K) are those of the formula

$$R^{10}{}_m Si(OR^9)_l R^{11}{}_k O_{(4-k-l-m)/2} \quad (X),$$

in which $R^9$ may be identical or different and denotes hydrogen or optionally substituted hydrocarbon radicals, $R^{10}$ may be identical or different and denotes a monovalent, optionally substituted, SiC-bonded hydrocarbon radical having 3 to 40 carbon atoms, $R^{11}$ may be identical or different and denotes a monovalent, optionally substituted, SiC-bonded hydrocarbon radical having 1 or 2 carbon atoms, k is 0, 1, 2, or 3, preferably 0 or 1, l is 0, 1, 2, or 3, preferably 2 or 3, more preferably 3, and m is 0, 1, 2, 3, or 4, preferably 1, with the proviso that the sum of k+l+m is less than or equal to 4 and there is at least one radical $R^{10}$ present per molecule.

Examples of optionally substituted hydrocarbon radicals $R^9$ are the examples specified for radical R.

The radicals $R^9$ are preferably hydrogen and hydrocarbon radicals that are optionally substituted by halogen atoms and that have 1 to 18 carbon atoms; more preferably hydrogen and hydrocarbon radicals having 1 to 10 carbon atoms; more particularly, methyl radical and ethyl radical.

Examples of optionally substituted hydrocarbon radicals $R^{10}$ are the examples specified for radical R of hydrocarbon radicals having at least 3 carbon atoms.

Radical $R^{10}$ preferably has an even number of carbon atoms.

Radical $R^{10}$ preferably comprises hydrocarbon radicals having 6 to 40 carbon atoms, more preferably the hexyl, isohexyl, isooctyl, octyl, decyl, dodecyl, tetradecyl, and the hexadecyl radical, very preferably the hexadecyl radical.

Examples of the organosilicon compounds (K) of the formula (X) that are optionally employed in accordance with the invention are isooctyltrimethoxysilane, isooctyltriethoxysilane, n-octyltrimethoxysilane, N-octyltriethoxysilane, decyltrimethoxysilanes, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

Radical $R^{11}$ preferably comprises the methyl radical.

The organosilicon compounds (K) of the formula (X) that are employed optionally in accordance with the invention are commercial products and/or are preparable by methods that are customary within chemistry.

The rheological additives (K) are preferably polyamide waxes, hydrogenated castor oils, or stearates.

Examples of organic solvents (K) are the compounds already identified above as solvents, preferably alcohols.

It is preferred for no organic solvents (K) to be added to the compositions of the invention.

If the compositions of the invention do comprise one or more components (K), the amounts involved are in each case preferably 0.5 to 200 parts by weight, more preferably 1 to 100 parts by weight, more particularly to 70 parts by weight, based in each case on 100 parts by weight of component (A).

The compositions of the invention are preferably compositions comprising
(A) 100 parts by weight of compounds of the formula (I),
(B) 60 to 1000 parts by weight of silicone resins comprising units of formula (II),
optionally
(C) 0.5 to 10 parts by weight of compound containing basic nitrogen,
optionally
(D) fillers,
optionally
(E) catalysts,
optionally
(F) adhesion promoters,
optionally
(G) water scavengers,
optionally
(H) additives, and
optionally
(K) adjuvants.

The compositions of the invention preferably comprise no further constituents other than components (A) to (K).

The components employed in accordance with the invention may in each case comprise one kind of such a component or else a mixture of at least two kinds of a respective component.

The compositions of the invention are preferably formulations having viscosities of preferably 500 to 1,000,000 mPas, more preferably of 1000 to 500,000 mPas, more particularly 1000 to 200,000 mPas, in each case at 25° C.

The compositions of the invention may be produced in any desired way that is known per se, such as, for instance, by methods and mixing techniques of the kind customary for the production of moisture-curing compositions. The sequence in which the various constituents are mixed with one another may be varied arbitrarily.

The present invention additionally provides a process for producing the composition of the invention, by mixing the individual components in any order.

This mixing may take place at room temperature under the pressure of the surrounding atmosphere, in other words around 900 to 1100 hPa. If desired, however, this mixing may also take place at higher temperatures, as for example at temperatures in the range from 30 to 130° C. It is possible, additionally, to carry out mixing occasionally or continually under reduced pressure, such as at an absolute pressure of 30 to 500 hPa, for example, in order to remove volatile compounds and/or air.

The mixing according to the invention takes place preferably in the absence of moisture.

The method of the invention may be carried out continuously or discontinuously.

The compositions of the invention are preferably one-component compositions which are storable in the absence of water and crosslinkable at room temperature on admittance of water. The compositions of the invention may alternatively be part of two-component crosslinking systems, in which OH-containing compounds, such as water, are added in a second component.

The typical water content of the air is sufficient to crosslink the compositions of the invention. Crosslinking of the compositions of the invention takes place preferably at room temperature. It can, if desired, also be carried out at higher or lower temperatures than room temperature, as for example at −5° to 15° C. or at 30° to 50° C., and/or by means of concentrations of water that exceed the normal water content of the air.

The crosslinking is carried out preferably under a pressure of 100 to 1100 hPa, more particularly under the pressure of the surrounding atmosphere, in other words approximately 900 to 1100 hPa.

The invention further provides shaped articles produced by crosslinking the compositions of the invention. The shaped articles of the invention may be any desired shaped articles, such as, for instance, seals, compressed articles, extruded profiles, coatings, impregnation systems, encapsulation, lenses, prisms, polygonal structures, laminate layers, or adhesive layers.

After curing, the compositions of the invention have very great tensile shear strengths, measured in accordance with DIN EN 204 after 7-day storage under standard conditions, i.e., at 1000 hPa and 23° C., of at least 7 MPa, preferably at least 8 MPa, and more preferably at least 10 MPa.

They are employed preferably as adhesives, which after curing have a tensile shear strength of at least 7 mPa, preferably at least 8 mPa, and more preferably at least 10 mPa. Preferably they are used for the adhesive bonding of wood, i.e., for bonds where at least one of the substrates to be bonded—preferably both substrates to be bonded—are of wood. The compositions of the invention are suitable in this context for bonding any types of wood. With particular preference they are employed for bonds which after curing, meet the DIN EN 204 D1, D2, D3, and/or D4 standards.

Additionally provided by the invention is a method for adhesive bonding or sealing of substrates, which comprises applying the composition of the invention to the surface of at least one substrate, then contacting said surface with the second substrate to be bonded and subsequently allowing crosslinking to take place.

Examples of substrates which may be bonded or sealed in accordance with the invention are wood in particular, but also plastics, including PVC, concrete, mineral substrates, metals, glass, ceramic, and painted surfaces. Materials both alike and different may be bonded to one another in this case.

The substrates used in accordance with the invention are preferably wood.

Further provided by the invention is a method for producing coatings or encapsulations, which comprises applying the composition of the invention to at least one substrate and then allowing crosslinking to take place.

Examples of this are encapsulating compositions for LEDs or other electronic components, the production of molded articles, composite materials, and composite moldings. By composite moldings are meant, here, a uniform molded article made from a composite material, which is composed of a crosslinking product of the compositions of the invention and of at least one substrate such that between the two components there is a firm, durable bond.

The compositions of the invention have the advantage that they are easy to produce.

The crosslinkable compositions of the invention have the advantage that they are distinguished by very high stability on storage and a high crosslinking rate.

The crosslinkable compositions of the invention further have the advantage that they exhibit an excellent adhesion profile.

Furthermore, the crosslinkable compositions of the invention have the advantage that they are easy to process.

Furthermore, the crosslinkable compositions of the invention have the advantage that they can be used to obtain adhesives having high tensile shear strength.

Another advantage of the compositions of the invention lies in the option, through choice of a low-viscosity component (B) of obtaining compositions having a low viscosity, i.e., very good processing qualities, without the need for this purpose to add large quantities of often unwanted solvents and/or plasticizers.

In the examples described below, all viscosity figures are based on a temperature of 25° C. Unless otherwise specified, the examples below are carried out under the pressure of the surrounding atmosphere, in other words approximately at 1000 hPa, and at room temperature, in other words at approximately 23° C., or at a temperature which comes about when the reactants are combined at room temperature without additional heating or cooling, and also at a relative atmospheric humidity of approximately 50%. All statements of parts and percentages, moreover, are based—unless otherwise indicated—on the weight.

INVENTIVE EXAMPLE 1

Preparation of a One-Component (1C) Adhesive Formulation 100 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized at 200 rpm for 2 minutes in a laboratory planetary mixer from PC-Laborsystem, fitted with two bar mixers, at about 25° C. with 150 g of a solvent-free, liquid phenylsilicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13,000 daltons (available commercially under the name SILRES® IC 368 from Wacker Chemie AG, Munich, DE), and 2.5 g of stabilizer (available commercially under the name TINUVIN® 123 from BASF AG, Germany; CAS No.: 129757-67-1). Thereafter 242.5 g of aluminum trihydroxide having a BET surface area of 3-5 m$^2$/g and a d50 of 1.7-2.1 µm (available commercially under the name "Martinal OL 104" from Albemarle Corp.) are incorporated with stirring at 600 rpm for one minute. Following incorporation of the aluminum trihydroxide, 7.5 g of N-(2-aminoethyl)-3-aminopropyltrimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation is dispensed into 310 ml PE cartridges and stored at 25° C. for a day prior to investigation.

INVENTIVE EXAMPLE 2

Preparation of a One-Component (1C) Adhesive Formulation 125 g of silane-terminated polypropylene glycol having an average molar mass ($M_n$) of 12 000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized at 200 rpm for 2 minutes in a laboratory planetary mixer from PC-Laborsystem, fitted with two bar mixers, at about 25° C. with 125 g of a solvent-free, liquid phenylsilicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13 000 daltons (available commercially under the name SILRES® IC 368 from Wacker Chemie AG, Munich, DE), and 2.5 g of stabilizer (available commercially under the name TINUVIN® 123 from BASF AG, Germany; CAS No.: 129757-67-1). Thereafter 242.5 g of aluminum trihydroxide having a BET surface area of 3-5 m$^2$/g and a d50 of 1.7-2.1 µm (available commercially under the name "Martinal OL 104" from Albemarle Corp.) are incorporated with stirring at 600 rpm for one minute. Following incorporation of the aluminum trihydroxide, 7.5 g of N-(2-aminoethyl)-3-aminopropyltrimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation is dispensed into 310 ml PE cartridges and stored at 25° C. for a day prior to investigation.

COMPARATIVE EXAMPLE 1

Preparation of a One-Component (1C) Adhesive Formulation 75 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) and 50 g of silane-terminated polypropylene glycol having an average molar mass ($M_n$) of 12,000 daltons and end groups of the formula —O—C(=O)—NH—(CH$_2$)$_3$—Si(OCH$_3$)$_3$ (available commercially under the name GENIOSIL® STP-E15 from Wacker Chemie AG, Munich, DE) are mixed and homogenized at 200 rpm for 2 minutes in a laboratory planetary mixer from PC-Laborsystem, fitted with two bar mixers, at about 25° C. with 7.5 g of vinyltrimethoxysilane, 45 g of a solvent-free, liquid phenylsilicone resin, which is composed of phenyl-functional T units (50-75 mol %) and dimethyl-functional D units (25-50 mol %) and has a alkoxy group content of 10-30 wt % (available commercially under the name SILRES® SY 231 from Wacker Chemie AG, Munich, DE), 2.5 g of crosslinking catalyst (Metatin 740), and 2.5 g of stabilizer (available commercially under the name TINUVIN® 123 from BASF AG, Germany; CAS No.: 129757-67-1). Thereafter 155 g of chalk having a BET surface area of 15 m$^2$/g and a d50 of 0.45 µm (available commercially under the name "Socal U1S2" from Solvay) and 155 g of chalk having a BET surface area of 3 m$^2$/g and a d50 of 0.45 µm (purchasable under the name "Imerseal 50" from Imerys) are incorporated with stirring at 600 rpm for one minute. Following incorporation of the chalk, 10 g of aminopropyl-trimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation is dispensed into 310 ml PE cartridges and stored at 25° C. for a day prior to investigation.

EXAMPLE 3

The tensile shear strengths of the adhesive formulations from inventive examples 1 and 2 and from comparative example 1 are determined as described in DIN EN 204. In this determination, the adhesive is applied to both beech specimens to be bonded, then drawn down using a 100 μm bar coater. The two wooden specimens are then joined over an area of 1 times 2 cm with an applied pressure of 5 kg. Following application of pressure for 24 hours, the specimens are stored under standard conditions for the period stated. For the determination of the D1 value, the tensile shear strength of the two bonded specimens is measured directly after storage. In the case of the D4 measurement, the storage period is followed by additional storage in boiling water for six hours. The specimens are subsequently removed from the water, dried off, and stored at room temperature for an hour. This is followed by determination of the tensile shear strength. The values achieved are those reported in table 1:

TABLE 1

| Storage conditions | Tensile shear strength [MPa] | | |
|---|---|---|---|
| | Inv. example 1 | Inv. example 2 | Comp. example 1 |
| D1 (7 days standard conditions) | 11.9 | 11.5 | 3.9 |
| D4 (21 days standard conditions, 6 h boiling water) | 3.8 | 3.9 | 0.8 |

INVENTIVE EXAMPLE 4

Preparation of a Silane-Terminated Polyurethane

A 6000 ml reaction vessel with stirring, cooling, and heating means is charged with 1098 g (6305 mmol) of toluene 2,4-diisocyanate (TDI) and this initial charge is heated to 60° C. Then a mixture of 207 g (854 mmol) of hexadecyl alcohol and 1248 g (2936 mmol) of a polypropylene glycol having an average molar mass of 425 g/mol is added. The temperature of the reaction mixture does not rise above 80° C. Subsequent stirring then takes place at 60° C. for 60 minutes.

The mixture is then cooled to about 50° C. and 75 ml of vinyltrimethoxysilane are added. Thereafter 4.2 g of a catalyst formulation comprising 2,2'-dimorpholino-diethyl ether (available commercially under the name Jeffcat® DMDLS from Huntsman) and 1200 g (567.8 mmol) of N-phenylaminomethyl-methyldimethoxysilane (available commercially under the name GENIOSIL® XL 972 from Wacker Chemie AG, Munich, DE) are added, the temperature not rising above 80° C. This is followed by subsequent stirring at 60° C. for 60 minutes more. In the resulting prepolymer mixture, isocyanate groups are no longer detectable by IR spectroscopy. A clear, transparent prepolymer mixture is obtained which has a viscosity of 13.5 Pas at 50° C. It can easily be processed further.

Preparation of a One-Component (1C) Adhesive Formulation 210 g of the above-prepared silane-terminated polyurethane and 25 g of silane-terminated polypropylene glycol having an average molar mass ($M_n$) of 12 000 daltons and end groups of the formula —O—C(═O)—NH—(CH$_2$)$_3$—Si(OCH$_3$)$_3$ (available commercially under the name GENIOSIL® STP-E15 from Wacker Chemie AG, Munich, DE) are homogenized at 200 rpm for 2 minutes in a laboratory planetary mixer from PC-Laborsystem, fitted with two bar mixers, at about 25° C. with 245 g of a solvent-free, liquid phenyl-silicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13 000 daltons (available commercially under the name SILRES® IC 368 from Wacker Chemie AG, Munich, DE), 10 g of vinyltrimethoxysilane and 2.5 g of stabilizer (available commercially under the name TINUVIN® 123 from BASF AG, Germany; CAS No.: 129757-67-1). Thereafter 10 g of 3-aminopropyltrimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation possesses a viscosity of 17 Pas at 25° C. It is dispensed into 310 ml PE cartridges and stored at 25° C. for a day prior to investigation.

COMPARATIVE EXAMPLE 2

Preparation of a One-Component (1C) Adhesive Formulation 340 g of silane-terminated polyurethane from inventive example 4 and 25 g of silane-terminated polypropylene glycol having an average molar mass ($M_n$) of 12,000 daltons and end groups of the formula —O—C(═O)—NH—(CH$_2$)$_3$—Si(OCH$_3$)$_3$ (available commercially under the name GENIOSIL® STP-E15 from Wacker Chemie AG, Munich, DE) are homogenized at 200 rpm for 2 minutes in a laboratory planetary mixer from PC-Laborsystem, fitted with two bar mixers, at about 25° C. with 100 g of a solvent-free, liquid phenyl-silicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13,000 daltons (available commercially under the name SILRES® IC 368 from Wacker Chemie AG, Munich, DE), 10 g of vinyltrimethoxysilane and 2.5 g of stabilizer (available commercially under the name TINUVIN® 123 from BASF AG, Germany; CAS No.: 129757-67-1). Thereafter 10 g of 3-aminopropyltrimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation, with a viscosity of 51 Pas at 25° C., is very viscous and can be handled only comparatively poorly. It is dispensed into 310 ml PE cartridges and stored at 25° C. for a day prior to investigation.

EXAMPLE 5

The tensile shear strengths of the adhesive formulations from inventive example 4 and from comparative example 2 are determined as described in DIN EN 204. In this determination, the adhesive is applied to both beech specimens to be bonded, then drawn down using a 100 μm bar coater. The two wooden specimens are then joined over an area of 1 times 2 cm with an applied pressure of 5 kg. Following application of pressure for 24 hours, the specimens are stored under standard conditions for the period stated. For the determination of the D1 value, the tensile shear strength of the two bonded specimens is measured directly after storage. In the case of the D4 measurement, the storage period is followed by additional storage in boiling water for six hours. The specimens are subsequently removed from the water, dried off, and stored at room temperature for an hour. This is followed by determination of the tensile shear strength. The values achieved are those reported in table 2:

TABLE 2

| Storage conditions | Tensile shear strength [MPa] | |
|---|---|---|
| | Inv. example 4 | Comp. example 2 |
| D1 (7 days standard conditions) | 16.1 | 14.3 |
| D4 (21 days standard conditions, 6h boiling water) | 6.1 | 2.1 |

INVENTIVE EXAMPLE 6

Preparation of a One-Component (1C) Adhesive Formulation 100 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized at 200 rpm for 2 minutes in a laboratory planetary mixer from PC-Laborsystem, fitted with two bar mixers, at about 25° C. with 387.5 g of a solvent-free, liquid phenylsilicone resin, which is composed exclusively of phenyl-functional T units and has a methoxy group content of 10-30 wt % and an average molar mass of 1000-2000 daltons (available commercially under the name SILRES® IC 678 from Wacker Chemie AG, Munich, DE), and 2.5 g of stabilizer (available commercially under the name TINUVIN® 123 from BASF AG, Germany; CAS No.: 129757-67-1). Thereafter, 11.5 g of N-(2-aminoethyl)-3-aminopropyl-trimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation possesses a viscosity of 1.0 Pas at 25° C. The formulation is dispensed into 310 ml PE cartridges and stored at 25° C. for a day prior to investigation.

INVENTIVE EXAMPLE 7

Preparation of a One-Component (1C) Adhesive Formulation 150 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized at 200 rpm for 2 minutes in a laboratory planetary mixer from PC-Laborsystem, fitted with two bar mixers, at about 25° C. with 337.5 g of a solvent-free, liquid phenylsilicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13,000 daltons (available commercially under the name SILRES® IC 368 from Wacker Chemie AG, Munich, DE), and 2.5 g of stabilizer (available commercially under the name TINUVIN® 123 from BASF AG, Germany; CAS No.: 129757-67-1). Thereafter, 12.5 g of N-(2-aminoethyl)-3-aminopropyl-trimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation possesses a viscosity of 1.6 Pas at 25° C. The formulation is dispensed into 310 ml PE cartridges and stored at 25° C. for a day prior to investigation.

INVENTIVE EXAMPLE 8

Preparation of a One-Component (1C) Adhesive Formulation 250 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized at 200 rpm for 2 minutes in a laboratory planetary mixer from PC-Laborsystem, fitted with two bar mixers, at about 25° C. with 237.5 g of a solvent-free, liquid phenylsilicone resin, which is composed of phenyl-functional T units (60-65 wt %) and methyl-functional T units (18-22 wt %) and dimethyl-functional D units (2-4 wt %) and has a methoxy group content of 12-16 wt % and an average molar mass of 800-13,000 daltons (available commercially under the name SILRES® IC 368 from Wacker Chemie AG, Munich, DE), and 2.5 g of stabilizer (available commercially under the name TINUVIN® 123 from BASF AG, Germany; CAS No.: 129757-67-1). Thereafter, 12.5 g of N-(2-aminoethyl)-3-aminopropyl-trimethoxysilane are mixed in at 200 rpm for 1 minute. The mixture, finally, is homogenized at 600 rpm for 2 minutes and 200 rpm for 1 minute, under the pressure of 100 mbar, and stirred until bubble-free.

The formulation possesses a viscosity of 2.9 Pas at 25° C. The formulation is dispensed into 310 ml PE cartridges and stored at 25° C. for a day prior to investigation.

EXAMPLE 9

The tensile shear strengths of the adhesive formulations from inventive examples 6, 7, and 8 are determined as described in DIN EN 204. In this determination, the adhesive is applied to both beech specimens to be bonded, then drawn down using a 100 µm bar coater. The two wooden specimens are then joined over an area of 1 times 2 cm with an applied pressure of 5 kg. Following application of pressure for 24 hours, the specimens are stored under standard conditions for the period stated. For the determination of the D1 value, the tensile shear strength of the two bonded specimens is measured directly after storage. In the case of the D4 measurement, the storage period is followed by additional storage in boiling water for six hours. The specimens are subsequently removed from the water, dried off, and stored at room temperature for an hour. This is followed by determination of the tensile shear strength. The values achieved are those reported in table 3:

TABLE 3

| Storage conditions | Tensile shear strength [MPa] | | |
|---|---|---|---|
| | Inv. example 6 | Inv. example 7 | Inv. example 8 |
| D1 (7 days standard conditions) | 10.2 | 10.1 | 10.3 |
| D4 (21 days standard conditions, 6 h boiling water) | 4.4 | 4.1 | 3.2 |

The invention claimed is:

1. A crosslinkable composition comprising:
   (A) 100 parts by weight of compounds (A) of the formula $$Y—[(CR^1{}_2)_b—SiR_a(OR^2)_{3-a}]_x \quad (I),$$

where
   Y is an x-valent organic polymer radical bonded via nitrogen, oxygen, sulfur, or carbon and which comprises, as a polymer chain, polyoxyalkylene, hydrocarbon polymer, polyurethane, polyester, polyamide, polyacrylate, polymethacrylate, or polycarbonate,
   R are identical or different and are monovalent, optionally substituted, SiC-bonded hydrocarbon radicals,
   $R^1$ are identical or different and are hydrogen or monovalent, optionally substituted hydrocarbon radicals, which are optionally attached to the carbon atom by a nitrogen, phosphorus, oxygen, sulfur or carbonyl group,
   $R^2$ are identical or different and are hydrogen or a monovalent, optionally substituted hydrocarbon radical,
   x is an integer from 1 to 10,
   a is identical or different and is 0, 1, or 2, and
   b is identical or different and is an integer from 1 to 10, and
   (B) more than 50 parts by weight of silicone resins comprising units of the formula $$R^3{}_c(R^4O)_d R^5{}_e SiO_{(4-c-d-e)/2} \quad (II),$$

where
   $R^3$ are identical or different and are hydrogen, a monovalent, SiC-bonded, optionally substituted aliphatic hydrocarbon radical, or a divalent, optionally substituted, aliphatic hydrocarbon radical which bridges two units of the formula (II),
   $R^4$ are identical or different and are hydrogen or a monovalent, optionally substituted hydrocarbon radical,
   $R^5$ are identical or different and are monovalent, SiC-bonded, optionally substituted aromatic hydrocarbon radicals,
   c is 0, 1, 2, or 3,
   d is 0, 1, 2, or 3, and
   e is 0, 1, or 2,
   with the proviso that the sum of c+d+e is less than or equal to 3 and in at least 40% of the units of the formula (II) the sum c+e is 0 or 1.

2. The crosslinkable composition of claim 1, wherein radical Y in formula (I) comprises polyurethane radicals or polyoxyalkylene radicals.

3. The crosslinkable composition of claim 1, wherein the end groups of the compounds (A) are groups of the formulae $$—O—C(=O)—NH—(CR^1{}_2)_b—SiR_a(OR^2)_{3-a} \quad (III)$$

and $$—NH—C(=O)—NR'—(CR^1{}_2)_b—SiR_a(OR^2)_{3-a} \quad (IV).$$

4. The crosslinkable composition of claim 1, comprising at least 60 parts by weight of component (B), based on 100 parts by weight of component (A).

5. The crosslinkable composition of claim 1, wherein the silicone resins (B) have an average molar mass (number average) $M_n$ of at least 400 g/mol and not more than 400,000 g/mol.

6. The crosslinkable composition of claim 1, comprising:
   (A) 100 parts by weight of compounds of the formula (I),
   (B) 60 to 1000 parts by weight of silicone resin(s) comprising units of formula (II),
   (C) optionally 0.5 to 10 parts by weight of a compound containing basic nitrogen,
   (D) optionally filler(s),
   (E) optionally catalyst(s),
   (F) optionally adhesion promoter(s),
   (G) optionally water scavenger(s),
   (H) optionally further additives other than (A) through (G), and
   (K) optionally adjuvants.

7. A process for producing a composition of claim 1, comprising mixing the individual components in any order.

8. A shaped article produced by crosslinking a composition of claim 1.

9. The shaped article of claim 8, having a DIN EN 204 tensile shear strength of at least 7 MPa after 7-day storage at 1000 hPa and 23° C.

10. A method for adhesive bonding or sealing of substrates, comprising applying a composition of claim 1 to the surface of at least one substrate, then contacting said surface with a second substrate to be bonded and allowing crosslinking to take place.

11. A method for producing coatings or encapsulations, comprising applying a composition of claim 1 to at least one substrate and allowing crosslinking to take place.

* * * * *